May 16, 1967 E. W. GRAHAM 3,319,341
PROFILE INDICATOR AND RECORDER
Filed Jan. 19, 1966 2 Sheets-Sheet 2
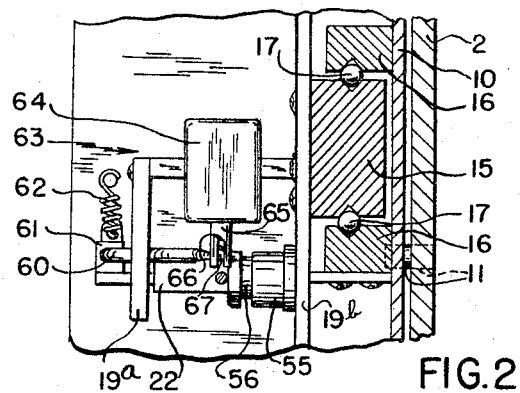
FIG. 2
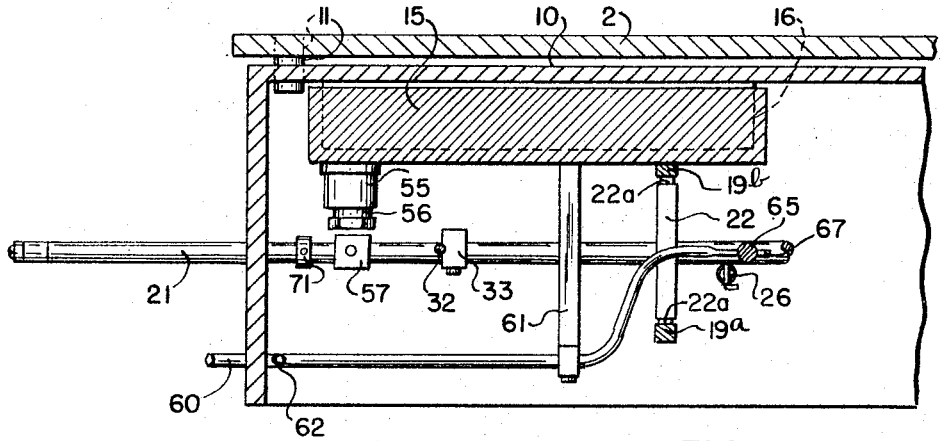
FIG. 3
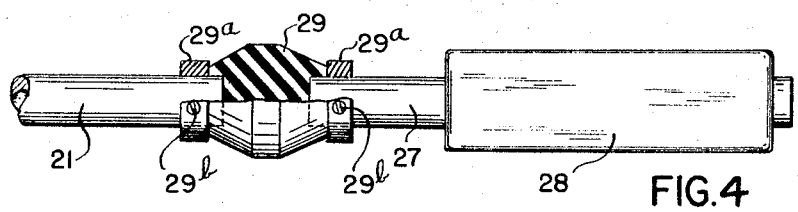
FIG. 4
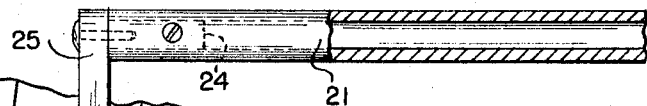
FIG. 5
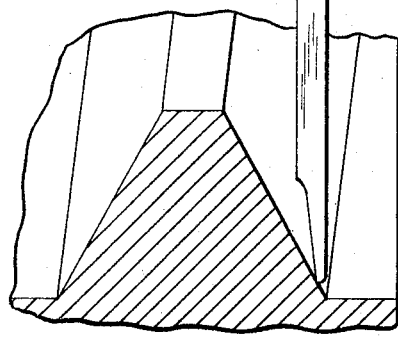
*INVENTOR.*
ERWIN W. GRAHAM
BY John H. Leonard
his ATTORNEY

United States Patent Office 3,319,341
Patented May 16, 1967

3,319,341
PROFILE INDICATOR AND RECORDER
Erwin W. Graham, Willoughby, Ohio, assignor to The Pipe Machinery Company, Wickliffe, Ohio
Filed Jan. 19, 1966, Ser. No. 521,742
5 Claims. (Cl. 33—174)

This invention relates to a profile indicator and recorder for indicating profiles of various surfaces by movement of a follower along a predetermined path in contact with the surface of which the profile is to be taken, and is an improvement on the profile indicator and recorder described and claimed in my co-pending application Ser. No. 414,104, filed Nov. 27, 1964, and entitled, Profile Indicator and Recorder.

In the above co-pending application, the profile indicator is one wherein electric signals produced by the rise and fall of the follower as it traverses the surface are fed to an amplifying recorder which produces a greatly enlarged graphical representation of the profile of the surface traversed. In those instances in which the surface being traversed is very steeply inclined, or is relatively rough, great difficulty is encountered in obtaining signals which produce an accurate profile. For use in the case of steep surfaces, a vibrator is provided which imparts to the follower high frequency vibrations in a direction upwardly and downwardly relative to the surface being traversed. This assists the follower in climbing the steep surfaces, but itself imparts undesirable vibrations and harmonics to the follower and its supporting structure. Again, in the case of relatively rough surfaces, the ridges and valleys of the surface cause the follower to bounce and vibrate. This erratic behavior of the follower in the above prior structure is due to the fact that vibrations imparted to the follower either by the vibrator or the surface tend to prevent the follower from remaining consistently on the actual surface and superimpose on the signals from the follower false signals of such severity as to produce a distorted final signal and profile.

In accordance with the present invention these extraneously imposed vibrations are controlled and damped so as to assure that the follower remains in contact with the surface at all times. At the same time, the vibrations are constrained from superimposing on the follower to an appreciable extent any vibration which distorts the true profile signal being produced, wherefore the recorder produces an enlarged, but very accurate, profile. The manner in which these vibrations are thus rendered substantially innocuous will become apparent from the following description wherein reference is made to the drawings, in which:

FIG. 2 is a fragmentary vertical cross-sectional view of the structure illustrated in FIG. 1, and is taken on line 2—2 thereof;

FIG. 3 is a fragmentary horizontal cross-sectional view of the structure illustrated in FIG. 1, and is taken on the line 3—3 thereof;

FIG. 4 is an enlarged fragmentary front elevation of a portion of the supporting arm of the follower, showing a counterweight and the connection thereof to the arm;

FIG. 5 is an enlarged fragmentary vertical longitudinal sectional view through a portion of the follower and of the coupling thread being engaged by the follower, part thereof being shown in section.

Figure 1:
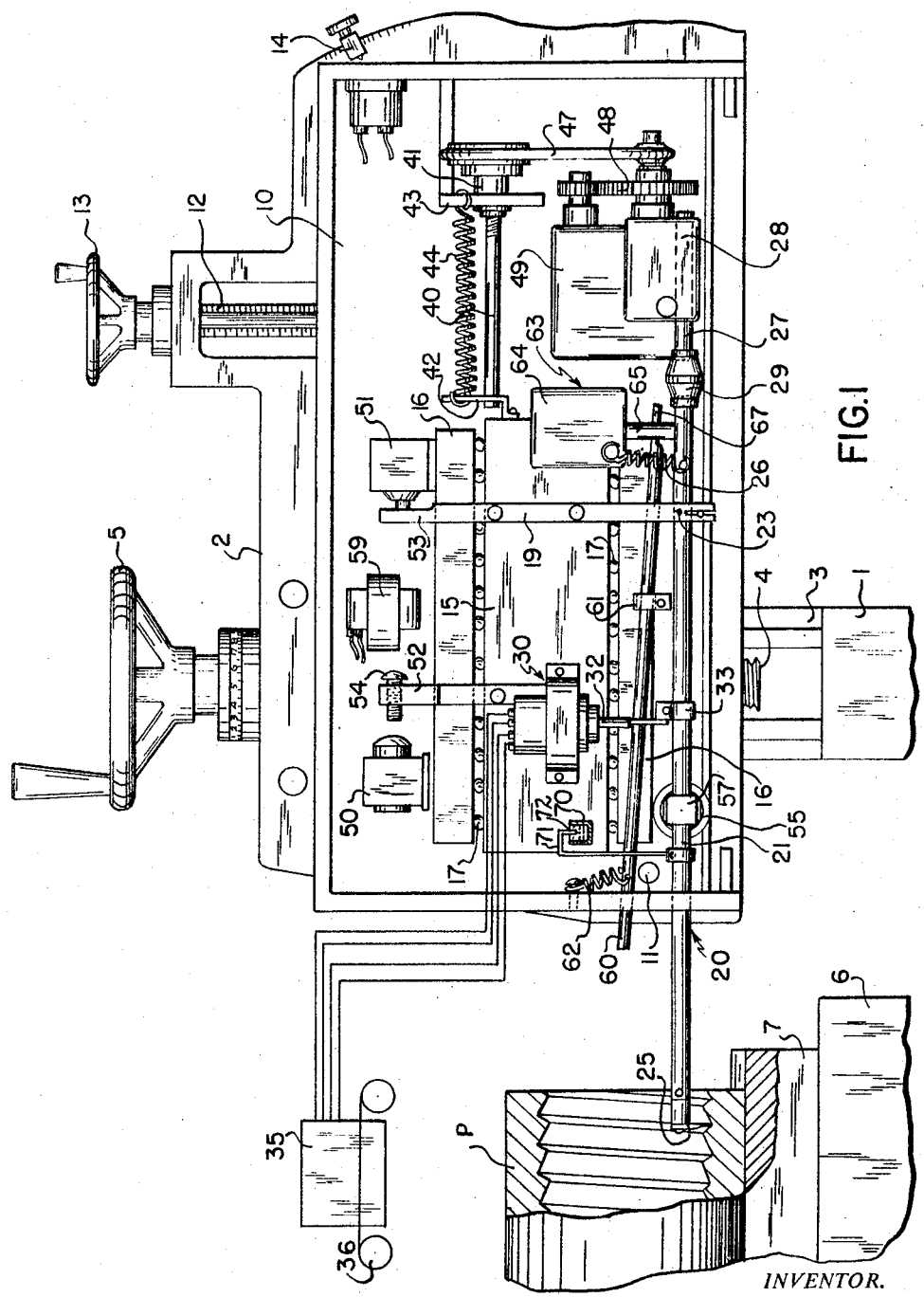
FIG. 1 is a front elevation of a profile indicator embodying the principles of the present invention, parts thereof being shown in section for clearness and illustration, and the structure being shown as applied in obtaining the profile of the thread of an internally threaded pipe coupling.

Referring to the drawings, the invention is shown as embodied in a bench type gauge structure comprising an upright pedestal 1 on which an elevating support 2 is mounted in a vertical dove tail guide 3 for movement in an upright lineal path. The elevating support 2 may be raised or lowered, selectively, by a conventional jack screw 4 operable by hand wheel 5.

The pedestal 1 may be disposed adjacent to a suitable article support 6 on the top of which is a work piece supporting platform 7. The platform 7 is shown as carrying an internally threaded pipe coupling P with its axis disposed horizontally.

Mounted on the elevating support 2 is a supporting frame 10 in the form of a rigid plate. The frame 10 is connected to the support 2 by a horizontal pivot 11 for swinging relative to the support 2 in a vertical plane. For swinging the frame 10 about the axis of the pivot 11, a suitable screw 12, operated by a handwheel 13, is mounted on the elevating support 2, and is connected to the frame 10 for swinging it upwardly and downwardly. A suitable clamp screw 14 is mounted on the support 2 for clamping engagement with the rear margin of the frame 10 for holding the frame 10 in selected rocked positions relative to the elevating support 2 about the axis of the pivot 11.

The frame 10 is arranged to support a carrier 15 for the profile follower. For this purpose frame 10 is provided with notched parallel guides 16 carrying preloaded balls 17 which antifractionally support and guide the carrier 15 for movement lineally of the frame 10 in a direction generally toward and away from the platform 7.

For supporting the follower on the carrier 15 for movement therewith along said path and for concurrent rocking movement relative thereto in coplanar paths angularly disposed to said lineal path, a suitable bracket 19, is fixedly mounted on the carrier by and, in turn, supports the follower. In the form illustrated, the bracket preferably comprises a pair of spaced arms 19a and 19b, as best illustrated in FIG. 2. The follower, indicated generally at 20, is pivotally supported by the arms 19a and 19b for rocking about an axis extending transversely of a path of the carrier 15. In the form illustrated, wherein the path of the carrier 15 is lineal and horizontal, the follower 20 is arranged to rock in a vertical plane. For this purpose, the follower is made in the form of a very long, rigid, hollow arm 21. Near one of its ends, the arm is fixedly secured to a transverse support 22, the ends of which are pivotally connected to the arms 19a and 19b, respectively, by means of very thin leaf springs 22a secured at their inner adjacent ends to the support 22 and having their outer ends secured in the arms 19a and 19b, respectively, thus providing friction free rocking about an axis 23.

The arm 21 extends forwardly, in the advancing direction of the carrier 15, beyond the frame 10 and at its forward end carries a follower head 24. Mounted on the forward end of the head 24 is a follower blade 25. The blade 25 is adapted to rest at its lower edge on the surface of an article of which the profile is to be taken. It is desirable that the blade 25 rest very lightly against the surface being profiled so that it can follow the profile without appreciable frictional resistance. Accordingly, means are provided for yieldingly urging the blade 25 against the surface of which the profile is to be taken. In the form illustrated, in which the arm 21 rocks about the horizontal axis 23, the means provided may be gravity, which may be assisted by a spring 26.

In order to counterbalance the arm 21, the arm is provided with an extension 27 on which a counterweight 28 is mounted for adjustment axially thereof. In order to eliminate the transmittal of vibrations between the arm 21 and the counterweight 28, a resilient damping and shock absorbing connection is provided. This connection is in the form of a resilient rubber cushion 29 having at its ends metal collars 29a which are vulcanized to the rubber and which carry set screws 29b.

The arm 21 and arm extension 27 have their adjacent ends received in the collars 30, respectively, in coaxial relation, and are secured thereto so that the only connection between the arm 21 and extension 27 is the resilient rubber cushion 29.

As more fully described in the above application, a transducer 30 is mounted on the carrier 15 with its armature connected by bracket 33 to the arm 21. The winding of the transducer is connected to the usual feedback system of a conventional amplifying recorder 35, which is provided with the usual travelling recording tape 36 engaged by a recording stylus which records in amplified form the profile of the surface being traversed by the blade 25.

For advancing the carrier 15 and platform 7 a micrometer screw 40 driven by an internally threaded micronut 41 is provided. One end of the screw 40 is secured by a bracket 42 to the carrier 15, and the other end passes through an element 43 which is rigid with the frame 10. A tension spring 44 interconnects the bracket and element 43 for eliminating slack. A nut 41 is driven through a belt 47 by a train of reduction gears 48 which, in turn, are driven by reversible variable speed direct current motor 49.

To stop the drive automatically in advanced position of the carrier and effect immediate return of the carrier to starting position, switches 50 and 51 are provided and positioned to be engaged by trigger fingers 52 and 53, respectively, on the carrier 15. The microswitch 50 starts the advance movement and initiates return.

As mentioned, it sometimes happens that the blade or follower must rise along a steep surface against which it is being pressed by advance of the carriage. If the angle is so steep as to jam the blade due to frictional resistance, a vibrator is provided.

In the above-entitled application the vibrator is one which imparts to the follower arm, such as the arm 21 herein, vibrations having substantial vertical components and substantial components directed forwardly and rearwardly of the direction of advance. These vibrations tended to cause vibration of the arm and also set up vibrations in the counterweight supported thereon. Again, if the surface over which the blade were passing were rough or had abrupt ridges or valleys, the blade would strike these ridges or valleys and be caused thereby to bounce upwardly and drop downwardly, and these movements or vibrations would be transmitted to the counterbalance.

By isolating the counterbalance from the vibrations of the arm 21 by the cushion 29 and arranging the vibrator so that the vibrations are generally horizontal and transverse to the direction of path of advance of the follower and to the arm 21, and, in addition, by damping the vibrations of the arm 21 by fluid damping such as used in the above application, much more accurate profiles are obtainable.

In the present structure instead of mounting the vibrator on the arm 21, as in the above pending application, the vibrator is mounted on the carriage 15. The vibrator comprises an alternating current coil 55 having a pole piece 56 which is adjustable axially of the coil. An armature 57 is secured on the arm 21 in closely spaced proximity to the pole piece 56 so that upon energization of the coil 55 with alternating current of the desired high frequency, horizontal transverse vibrations are imposed on the arm 21.

The coil 55 is connected electrically to the secondary of a step down transformer 59. The coil, when energized, causes lateral vibration of the arm 21 and thereby the blade 25. This vibration may be maintained during the advance of the blade and when so maintained reduced to a negligible amount any frictional resistance, and assures climbing of the blade up steep inclined surfaces against which it would otherwise jam. At the same time, vibration components up and down or axially of the arm, which would tend to distort the electrical signals are not produced.

To guard against jamming of the blade accidentally, suitable retracting means are provided. The retracting means may comprise a lever 60 pivotally connected by a bracket 61 to one of the guides 16 on frame 10 for swinging in a vertical plane. One end of the lever 60 extends forwardly beyond the frame 10 for access for manipulation by the hands of an operator. The lever 60 is urged in a clockwise direction in FIG. 1 by means of a tension spring 62, connected to the lever near one end. The opposite end of the lever is connected to a solenoid lift, indicated generally at 63, and comprising a coil 64 and plunger 65. The plunger 65 is provided with a slot 66 through which the flattened end 67 of the lever 60 extends. When the solenoid is unenergized, rocking of the lever 60 clockwise in FIG. 1 by the spring 62 releases the solenoid plunger 61 so that it moves downwardly against the arm 21 at the opposite side of the pivot 23 from the blade 25, and thereby rocks the arm clockwise to lift the blade 25 out of engagement with the threaded surface of the coupling P. On the other hand, when the solenoid is energized, its plunger 65 rises, overcoming the spring 62, and releasing the arm 21 for rocking movement about its axis 23, so that the blade 25 lowers into engagement with the threaded surface. The device may be operated automatically if desired as set forth in the above co-pending application but the means for control thereof forms no part of the present invention.

It is desirable that further damping be provided in addition to that obtained by the isolation of the counterweight 29 from the vibrations in the arm 21. For this purpose, a damper such as described in the above application is provided. As illustrated in FIG. 1, this damper may comprise a container 70 containing a viscous liquid 71, such as light silicone liquid, in which a finger 72 is partially immersed. The finger is mounted on the arm 21 for rocking therewith about the horizontal axis of the arm so that the fluid damps the movement of the arm.

In many cases it is unnecessary to use the vibrator, but the possibilities of the blade jumping upwardly off of a rough surface or dropping into a valley therein, and thus introducing bouncing and vibration in the arm 21 are always present. Due to the damping of the arm 21 by the finger 82 and the isolation of the counterbalance from the arm by the cushion 29, these types of vibrations are rendered substantially innocuous so that the blade continually maintains its contact with, and rides on, the surface being scanned and a true enlarged profile of the surface scanned by the traverse of the blade therealong is obtained.

Having thus described my invention, I claim:

1. A profile indicator comprising an article supporting member, a carrier member, supporting means supporting the members for movement along a predetermined path relatively toward and away from each other, a rocking arm mounted on the carrier member for relative movement along said path during said relative movement of the members and for concurrent rocking movement relative to the carrier member about an axis extending transversely of the path, a follower on the arm in spaced relation to said axis and having a portion adapted to ride on a surface of an article on the article supporting member during said relative movement of the members along said predetermined path, signal producing means operatively connected to the follower and operated thereby to produce signals reflecting rocked positions of the follower about said axis, means operative in response to signals from the signal producing means to indicate the profile being traversed by said portion of the follower, a counterweight for said arm, a resilient shock absorbing means connected to the weight and connected to the arm at the opposite side of the axis from the follower and thereby connecting the weight to the arm at said opposite side of the axis.

2. A profile indicator according to claim 1 wherein a high frequency vibrator is drivingly connected to the follower for causing the follower to vibrate at high frequency during said movements of the follower, and is arranged so that the vibrations imparted by the vibrator are generally endwise of said rocking axis.

3. A profile indicator according to claim 1 wherein damping means interconnect the arm and carrier so as to damp the rocking of the arm about said axis.

4. A profile indicator according to claim 1 wherein a high frequency vibrator is drivingly connected to the follower for causing the follower to vibrate at high frequency during said movements of the follower, and is arranged so that the vibrations imparted by the vibrator are generally in a direction endwise of said rocking axis, and damping means interconnect the arm and carrier so as to damp the rocking of the arm about said axis.

5. A profile indicator according to claim 1 wherein vibration damping means are connected to the arm for limiting the amplitude of vibration.

References Cited by the Examiner

UNITED STATES PATENTS 2,859,529  11/1958  Aller et al. _____ 33—174

LEONARD FORMAN, *Primary Examiner.*

S. S. MATTHEWS, *Assistant Examiner.*